United States Patent
Kwasniewski et al.

(10) Patent No.: US 8,075,834 B2
(45) Date of Patent: Dec. 13, 2011

(54) BLOW MOLDING MACHINE AND ASSOCIATED MECHANISMS

(75) Inventors: Waldemar Boleslaw Kwasniewski, Zaborow/Feliksow (PL); Slawomir Ireneusz Strupinski, Warsaw (PL); Pawel Stefan Artyminski, Warsaw (PL); Dariusz Pawel Assendi, Warsaw (PL); Robert Bartnik, Warsaw (PL); Dominik Kordula, Warsaw (PL); Andrzej Tomasz Kowalczyk, Sulejowek (PL); Leszek Kozak, Siedlce (PL); Robert Grzegorz Rogaczewski, Goszcz (PL); Wojciech Solyga, Warsaw (PL); Marek Wojciech Weglowski, Warsaw (PL); Grzegorz Jaroslaw Woinski, Warsaw (PL); Bogdan Ludwik Zareba, Warsaw (PL)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 12/682,903

(22) PCT Filed: Oct. 31, 2008

(86) PCT No.: PCT/US2008/081932
§ 371 (c)(1),
(2), (4) Date: Apr. 14, 2010

(87) PCT Pub. No.: WO2009/059091
PCT Pub. Date: May 7, 2009

(65) Prior Publication Data
US 2010/0225033 A1    Sep. 9, 2010

Related U.S. Application Data

(60) Provisional application No. 60/984,174, filed on Oct. 31, 2007.

(51) Int. Cl.
B29C 49/04    (2006.01)

(52) U.S. Cl. ......... 264/538; 264/539; 264/540; 425/540

(58) Field of Classification Search .................. None
See application file for complete search history.

(56) References Cited

U.S. PATENT DOCUMENTS

| | | |
|---|---|---|
| 3,694,124 A | 9/1972 | Saumsiegle et al. |
| 3,860,104 A | 1/1975 | Strauss |
| 3,890,081 A | 6/1975 | Grundmann |
| 4,718,845 A | 1/1988 | Sheffield et al. |
| 4,723,906 A | 2/1988 | Gibbemeyer |
| 4,801,260 A | 1/1989 | Oles et al. |
| 4,874,281 A | 10/1989 | Bergerioux et al. |

(Continued)

*Primary Examiner* — Monica A Huson
(74) *Attorney, Agent, or Firm* — Stradley Ronon Stevens & Young, LLP

(57) ABSTRACT

A machine (10) for blow molding containers (110). The machine (10) has a stationary flow head (26) located above a turntable (12) with molds (16) mounted on carriages (38). The carriages (38) are mounted on ramps (40) and are raised to remove containers (110) and are lowered from the flow head (12) using a closed loop hydraulic system actuated by a cam. A double rack-and-pinion assembly (78) guides opening and closing of the molds (16) and a locking system having locking shafts (94, 96) engaging apertures (98, 100) in a cross head (74) with pivoting locking keys (102, 104) movable into alignment with the apertures (98, 100) prevents inadvertent mold opening. A container transfer device (32) has inflatable bladders (140) which engage the interior of the containers (110) to prevent damage. Augmented cooling of the containers (110) in the mold (16) is provided by positioning the flow head (26) at an acute angle (28) to the transfer device (32). Different molds (16) may be positioned on the turntable (12) in an alternating arrangement to facilitate production changeover.

27 Claims, 13 Drawing Sheets

U.S. PATENT DOCUMENTS

| | | |
|---|---|---|
| 5,486,103 A | 1/1996 | Meiring et al. |
| 5,544,466 A | 8/1996 | Bonnet |
| 6,471,907 B1 * | 10/2002 | Krall et al. .................. 264/509 |
| 6,649,120 B1 | 11/2003 | Johnson |
| 2002/0086083 A1 | 7/2002 | Singleton |
| 2006/0099294 A1 | 5/2006 | Netsu |

* cited by examiner

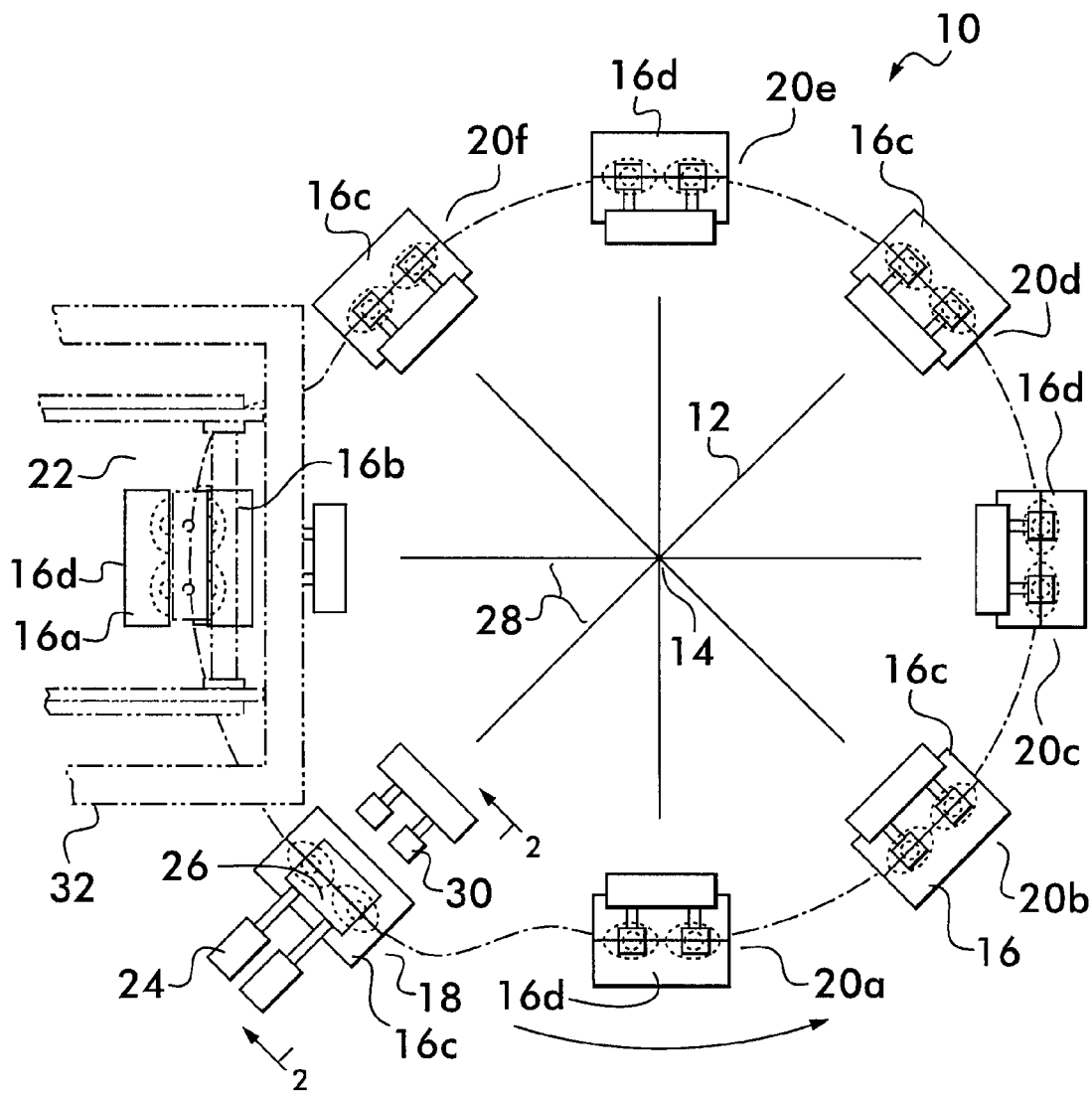
FIG.1

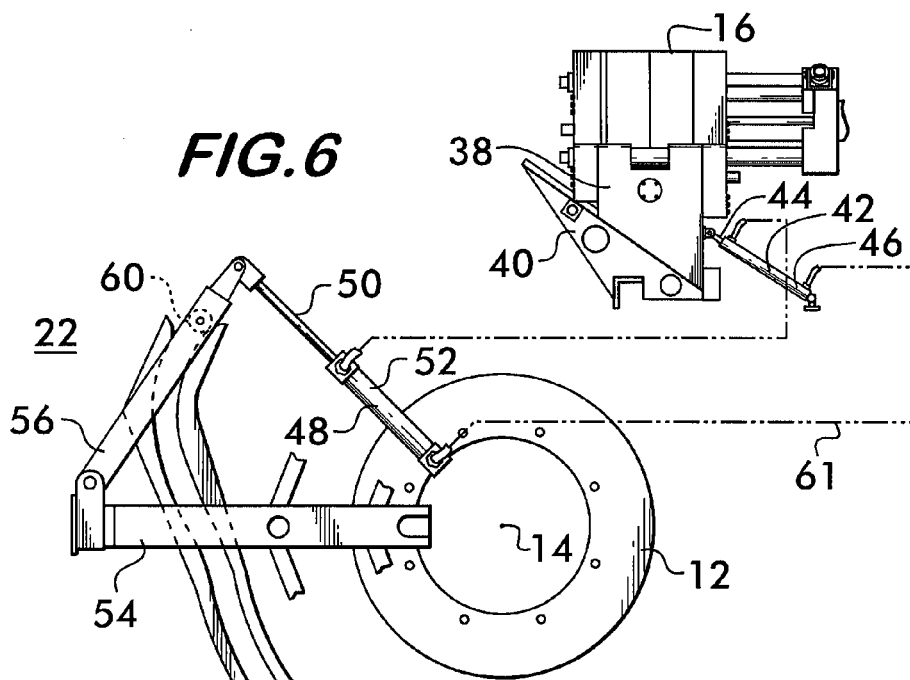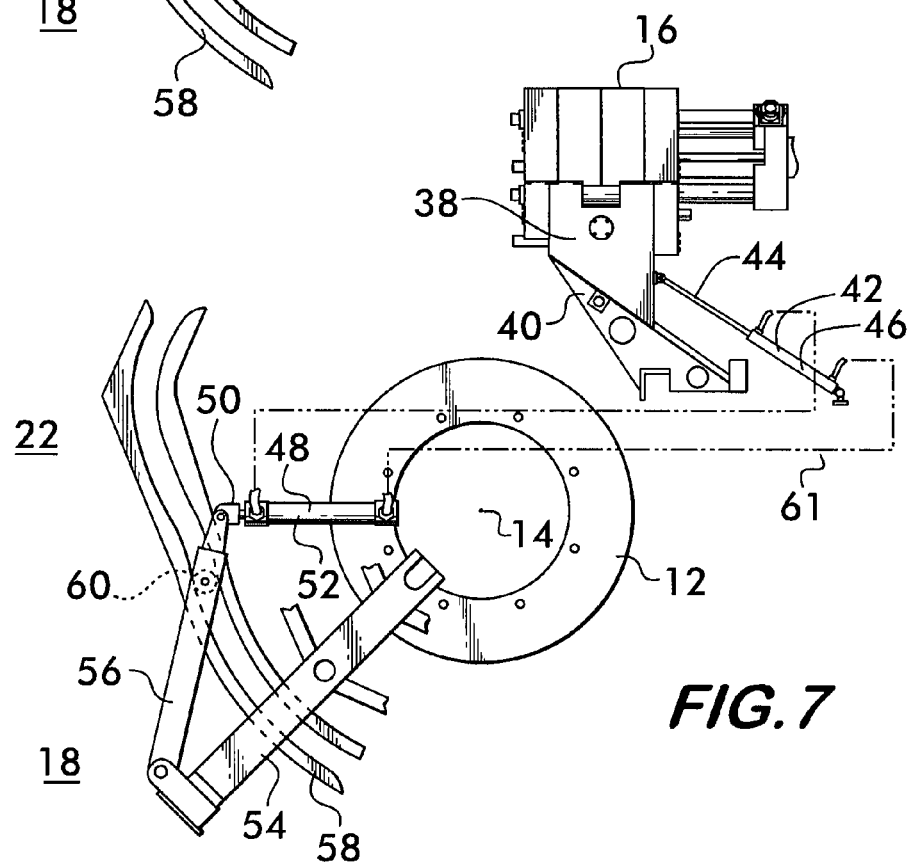

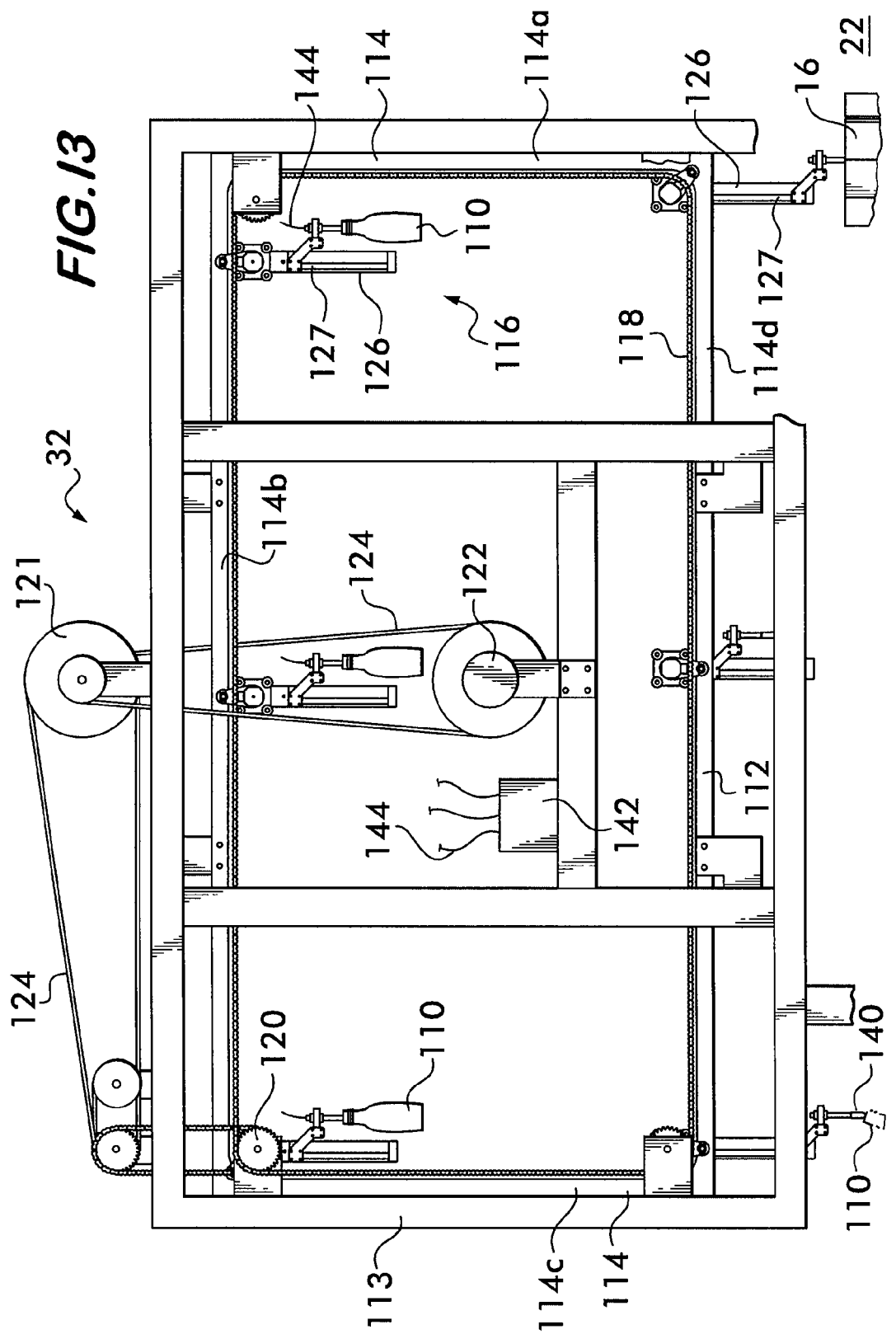

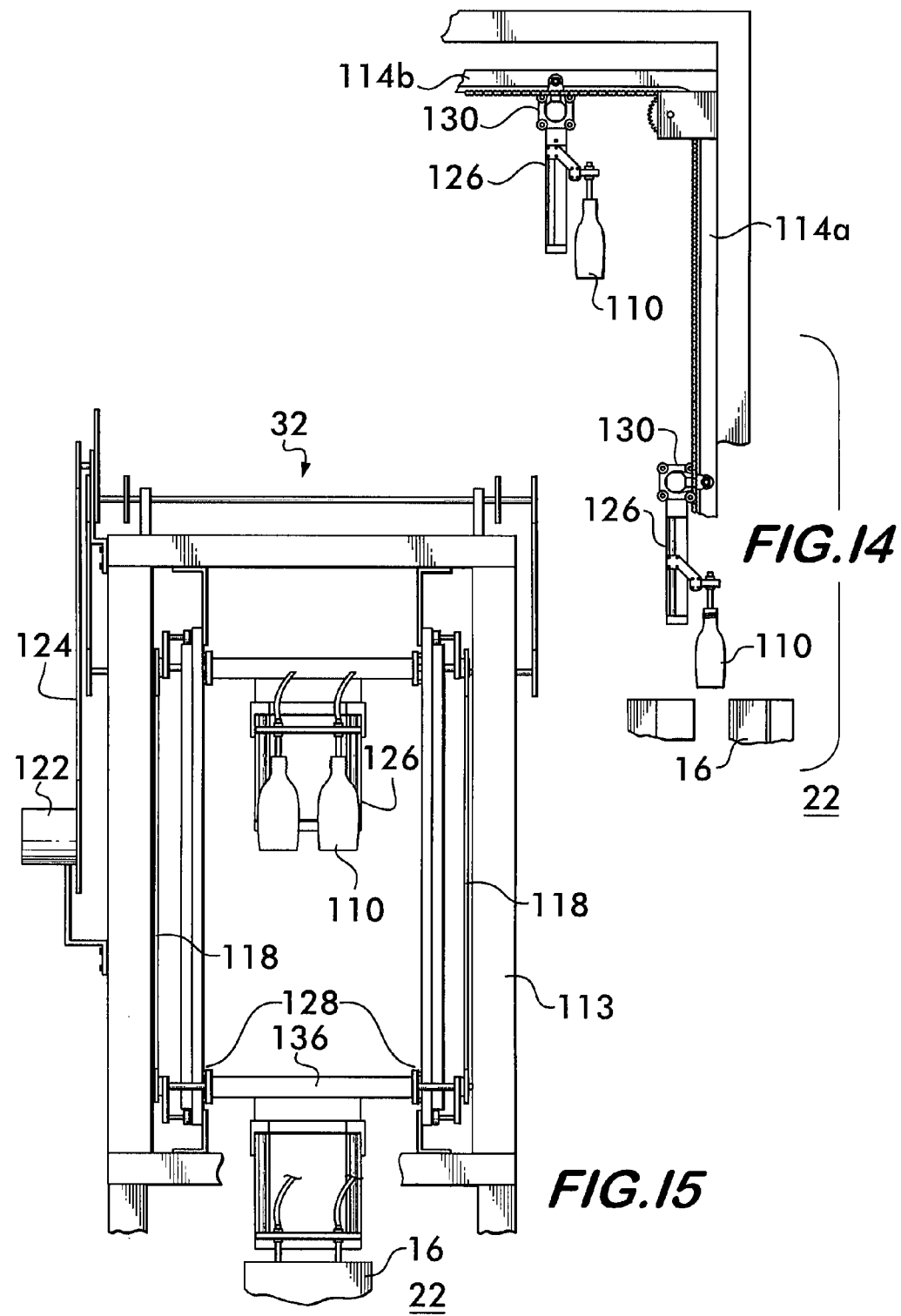

BLOW MOLDING MACHINE AND ASSOCIATED MECHANISMS

RELATED APPLICATION

This application claims the benefit of priority to U.S. Provisional Patent Application Ser. No. 60/984,174, filed on Oct. 31, 2007, the contents of which are incorporated in this application by reference.

FIELD OF THE INVENTION

This invention relates to a machine and a method for blow molding containers from plastic resin.

BACKGROUND OF THE INVENTION

Containers holding liquids and bulk solids are economically manufactured in a continuous blow molding process, wherein a parison comprising a hollow tube of molten polymer resin is extruded continuously from a flow head. The parison is acted on by a series of moving molds, each of which is formed of mold halves which are moved sequentially to a position beneath the flow head in an open configuration. The flow head is positioned above the path of the molds and is moved downwardly toward each open mold as it arrives beneath the flow head to position a portion of the parison between the mold halves. The mold halves close about the parison portion from opposite sides. As the mold halves comprising a particular mold close about, the parison portion, knives sever the parison portion from the continuously extruding parison, and a clamp pinches the end of the extruding parison to seal it, allowing the parison to be inflated to prevent it from collapsing in on itself.

The flow head is moved upwardly away from the mold path and the mold, now clear of the extruding parison, moves away from the flow head to allow the next mold to be positioned beneath the flow head and engage its respective parison portion being extruded. After a parison portion is engaged by a mold and cut from the parison, air is injected into the parison portion forcing it to expand and assume the shape of the mold. The newly molded container is allowed to cool and the mold is then opened to release the container to a conveyor, which transports the container for further processing. The mold then travels back to the flow head to mold another container.

Although such machines allow for high production rates of uniform containers, there are disadvantages in the various mechanisms and the method which, if eliminated, will result in more reliable production of high quality containers. One such problem involves the moving flow head. The parison acts as a pendulum as it dangles beneath the flow head while it is being extruded. The knives which sever the parison portion from the parison and the clamp which pinches and seals the parison cause the parison to swing when they disengage from it. Motion of the flow head tends to amplify the swinging motion of the parison, which can lead to irregularities is and flaws in the containers as the mold halves close on a parison portion that is in a different position and orientation from one mold to the next.

Mold closing also affects the quality of the molded container. It is important that the molds close in precise alignment consistently and maintain the precise alignment throughout the molding process. The molds must withstand significant internal pressure without shifting or parting to ensure a quality container with the requisite uniformity of production.

Mold cooling also affects the container production. The longer the cooling time, the less likely a container will be damaged during handling upon removal from a mold. Increased cooling time must be weighed against a decrease in output, however, and it would be advantageous if longer cooling time could be realized without adversely affecting the machine output. It would also be advantageous to provide a handling mechanism for removing containers from molds which is gentle and will not damage the container when it is most vulnerable during cooling.

SUMMARY OF THE INVENTION

The invention concerns a machine for blow molding containers from a tubular parison formed of plastic resin supplied by an extruder. The machine comprises a horizontally oriented turntable rotatable about a substantially vertical axis of rotation. A plurality of inclined ramps are mounted on the turntable. The ramps face radially outwardly. A carriage is mounted on each of the ramps. Each carriage is movable along the ramp between a first position and a second position above the first position. A mold is mounted on each of the carriages. The molds comprise mold portions which are movable between an open configuration to receive the parison and a closed configuration to mold the parison.

A flow head receives the resin and forms the tubular parison. The flow head is fixedly positioned at a first station of the machine above the turntable. The turntable is rotatable to position each of the molds beneath the flow head in turn. Each of the molds is movable on its respective carriage upwardly along the ramp toward the flow head to receive the parison.

The machine also has a last station. The turntable is rotatable to position each of the molds at the last station in turn. The molds are in the open configuration at the last station for removal of the containers therefrom. The first station is positioned at an acute angle from the last station measured relative to the turntable axis of rotation. The acute angle may be, for example, about 45° for an eight-station machine.

A first hydraulic actuator is mounted on the turntable and engaged with one of the carriages for moving the one carriage along the ramp. A second hydraulic actuator is mounted on the turntable and engaged with a cam follower. The first and second actuators are hydraulically connected in a closed loop such that actuation of the second actuator causes actuation of the first actuator. A cam track is positioned adjacent to the turntable. The cam follower is engageable with the cam track upon rotation of the turntable to actuate the second actuator. Actuation of the second actuator actuates the first actuator to move the one carriage from the first to the second position to receive the parison from the flow head.

First and second guide rods are mounted on opposite sides of each of the carriages. One of the guide rods is positioned higher above the turntable than the other on each of the carriages. First and second platens are mounted on the guide rods on each of the carriages. The platens are movable along the guide rods toward and away from one another. One of the mold portions is mounted on each of the platens. Movement of the platens moves the mold portions between the open and closed configurations. Preferably, the guide rods are arranged such that the guide rod positioned higher above the turntable on each of the carriages is positioned adjacent to one of the guide rods in a lower position on an adjacent carriage.

In another embodiment, first and second guide rods again are mounted on opposite sides of each of the carriages. First and second platens are mounted on the guide rods. The platens are movable along the guide rods toward and away from one another. One of the mold portions is mounted on each of the platens. Parallel movement of the platens moves the mold portions between the open and closed configurations. A first actuator is mounted on the guide rods and engages the first platen. The first actuator moves the first platen toward and away from the second platen for opening and closing the molds in a parallel manner. A second actuator is mounted on one of the platens between the one platen and the mold portion mounted thereon. The second actuator applies a force between the one platen and the mold portion mounted thereon to hold the mold portions in engagement with one another when in the closed configuration.

The invention may also include a crosshead positioned adjacent to the first platen and attached to the guide rods. The crosshead defines an aperture. A locking shaft is mounted on the first platen and has an end engaged with the aperture. The first actuator is mounted on the crosshead and moves the first platen relative to the guide rods toward and away from the second platen. The locking shaft passes through the aperture upon movement of the first platen. A locking key is pivotably mounted on the crosshead. The locking key is pivotable between a first position away from the aperture, and a second position aligned with the aperture. The locking key is engageable with the end of the locking shaft to prevent motion of the locking shaft through the aperture when the second actuator applies a force.

The machine according to the invention may have a plurality of different types of molds for molding different types of containers. For example, the plurality of molds may include a group of first molds for molding a first container and a group of second molds for molding a second container. In this embodiment, it is advantageous that each of the first molds is positioned on one of the carriages adjacent to a carriage carrying one of the second molds in an alternating sequence.

The machine further comprises a container transfer device positioned at a last station of the machine. The turntable is rotatable to position each of the molds at the last station in turn. The transfer device comprises an endless conveyor defining a path having a vertical leg positioned above the turntable at the last station. At least one truck is mounted on the conveyor and movable along the path. The truck is positionable above the turntable. An inflatable bladder for each cavity of the mold is mounted on the truck and extends downwardly therefrom. A bladder inflation mechanism is operatively associated with the bladder. The bladder is positionable within one of the containers in one of the molds positioned at the last station. Inflation of the bladder grips the container. The mold is moved into the open configuration at the last station to release the container. Motion of the truck along the vertical leg above the turntable removes the container away from the mold.

An actuator is mounted on the truck. The actuator moves the bladder relative to the truck for positioning the bladder within the containers when at the last station and for removing the containers away from the molds.

The path may have a rectangular form comprising another vertical leg and first and second horizontal legs. The truck is movable along the first horizontal leg away from the turntable and toward the turntable along the second horizontal leg.

The path is defined by a pair of horizontal rails joined to a pair of vertical rails end-to-end. The truck comprises a rectangular chassis having four idler wheels. One idler wheel is positioned at each corner of the chassis. The idler wheels ride on one side of the rails. The truck further includes a swing arm pivotably mounted on the chassis which has an opposing wheel mounted on an end thereof. The opposing wheel runs on an opposite side of the rails from the idler wheels to maintain the truck on the rails.

The invention also encompasses a method of blow molding a container from a tubular parison of molten resin. The method comprises:
  (a) extruding the molten resin to form the parison;
  (b) opening a mold;
  (c) closing the mold in parallel around the parison;
  (d) locking the mold in a closed position;
  (e) exerting a clamping force on the mold in the closed position; and
  (f) blowing compressed gas into the parison to conform the parison to the mold thereby producing the container.

The method may also include:
  (g) moving the mold upwardly toward a flow head to receive the parison;
  (h) simultaneously moving the mold downwardly away from the flow head while exerting the clamping force and inserting a blow pin into the mold for the blowing of the compressed gas into the parison.

In the method contemplated it is advantageous to extrude the parison from a stationary flow head.

In another aspect of a method of blow molding a container from a tubular parison of molten resin, the method comprises:
  (a) providing a plurality of different molds mounted on a blow molding machine;
  (b) extruding the molten resin to form the parison;
  (c) receiving the parison only in selected molds of the plurality of molds one after another; and
  (d) blowing compressed gas into the parison in each of the selected molds to conform the parison to the selected mold thereby producing the container.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying figures. It is emphasized that, according to common practice, the various features of the figures are not to scale. On the contrary, the dimensions of the various features are arbitrarily expanded or reduced for clarity. Included in the drawing are the following figures:

FIG. 1 is a schematic plan view of a blow molding machine according to the invention;

FIGS. 6 and 7 are schematic views illustrating the operation of a cam and hydraulic mechanism for raising and lowering the carriage shown in FIG. 2;

FIG. 13 is a side view of a container transfer device according to the invention;

FIG. 14 is a partial view of the container transfer device shown in FIG. 13;

FIG. 15 is an end view of the container transfer device shown in FIG. 13;

DETAILED DESCRIPTION OF THE EMBODIMENTS

Figure 2:
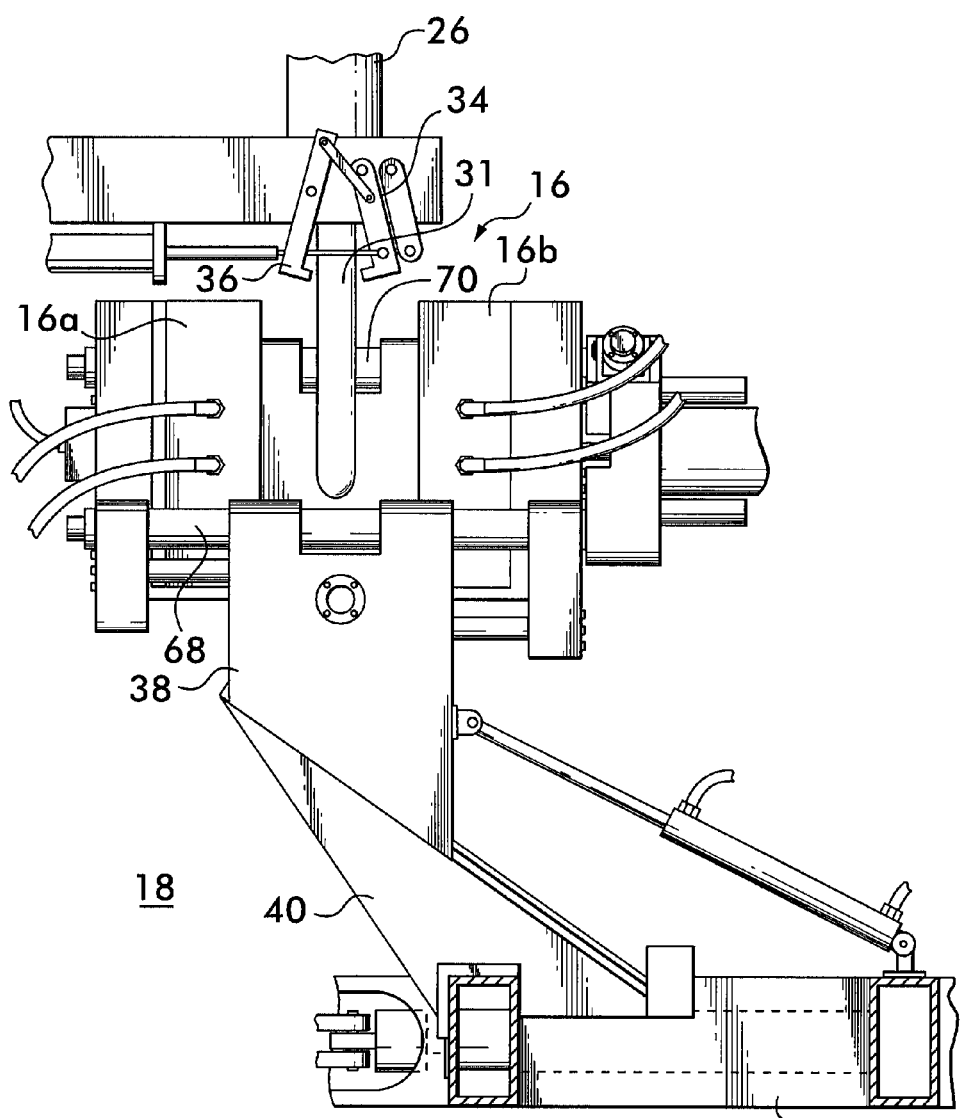
FIG. 2 is a side view of the flow head, carriage, and mold of the machine taken along the line 2-2 of FIG. 1.

Referring now to the drawing, in which like reference numbers refer to like elements throughout the various figures that comprise the drawing, FIG. 1 shows a schematic plan view of an exemplary blow molding machine 10 according to the invention. Machine 10 comprises a turntable 12 rotatable by an electric motor (not shown) about an axis of rotation 14. Preferably, the turntable 12 is oriented horizontally and the axis of rotation 14 is substantially vertical.

One or more molds 16 are mounted on the turntable 12. Rotation of the turntable 12 counterclockwise positions each mold 16 successively at a plurality of stations including a first station 18, a plurality of intermediate stations 20a-20f, and a last station 22. The number of stations is equal to the number of molds 16 on the turntable 12, in this example, eight, although more or fewer stations are feasible. Each mold 16 comprises two mold portions 16a and 16b which are movable between an open configuration, as shown at the last station 22, and a closed configuration, shown at the first station 18 and the intermediate stations 20a-20f.

The machine 10 also includes an extruder 24 which feeds molten polymer resin to a flow head 26 positioned at the first station 18. The first station 18 is positioned at a predetermined angle 28 relative to the last station 22 as measured with respect to the turntable axis of rotation 14. By "predetermined" is meant determined beforehand, so that the predetermined angle 28 must be determined, i.e., chosen or at least known, before the machine 10 is used. For the example configuration shown in FIG. 1, for which eight stations are provided, the predetermined angle 28 is preferably an acute angle of about 45°. This relative positioning is advantageous because it provides increased cooling time for a molded container 110 (see FIG. 13) as it traverses the large remaining angle (315° in the illustrated example) occupied by the intermediate stations 20a-20f and last station 22 before being released from the mold 16 at the last station 22.

The machine 10 also includes a plurality of blow pins 30 mounted on the turntable 12. The blow pins 30 cooperate with each of the molds 16 to form a calibrated neck on the container 110 and inject compressed gas into a parison portion received within the mold 16 to conform the parison portion to the shape of the mold 16 as described below. The dimensions of the calibrated neck are held to relatively high precision and close tolerances. A container transfer device 32 is positioned at the last station 22 for removing containers 110 from the mold 16 after they have cooled and for transporting the containers 110 for further processing, such as de-flashing.

The first station 18 is shown in detail in FIG. 2. One of the molds 16 is shown in the open configuration, with mold portions 16a and 16b separated, to receive the molten resin parison 31 which is continuously extruded from the flow head 26. A cutter 34 is located adjacent to the flow head 26 for separating a parison portion from the parison 31 upon closing of the mold 16. A clamp 36 operates to pinch the end of the extruding parison 31 and seal it so as to allow the parison 31 to be inflated, preventing the parison 31 from folding in on itself and collapsing as it is extruded from the flow head 26.

In the machine 10, according to the invention, the flow head 26 is fixedly positioned at the first station 18 and does not move vertically to feed the parison 31 to the molds 16. The parison 31 is suspended beneath the flow head 26 and tends to swing like a pendulum if disturbed. Some parison motion is caused by the action of the cutter 34 and the clamp 36 and is unavoidable. It is advantageous to minimize disturbances to the parison 31 as it is extruded beneath the flow head 26 and to allow any motion to damp out so that the parison 31 enters each mold 16 in substantially the same orientation and position to ensure consistency and quality of the containers 110. To this end, it is advantageous to extrude the parison 31 from a stationary flow head 26, thereby eliminating a source of disturbance which would otherwise cause unwanted parison motion.

Figure 3:
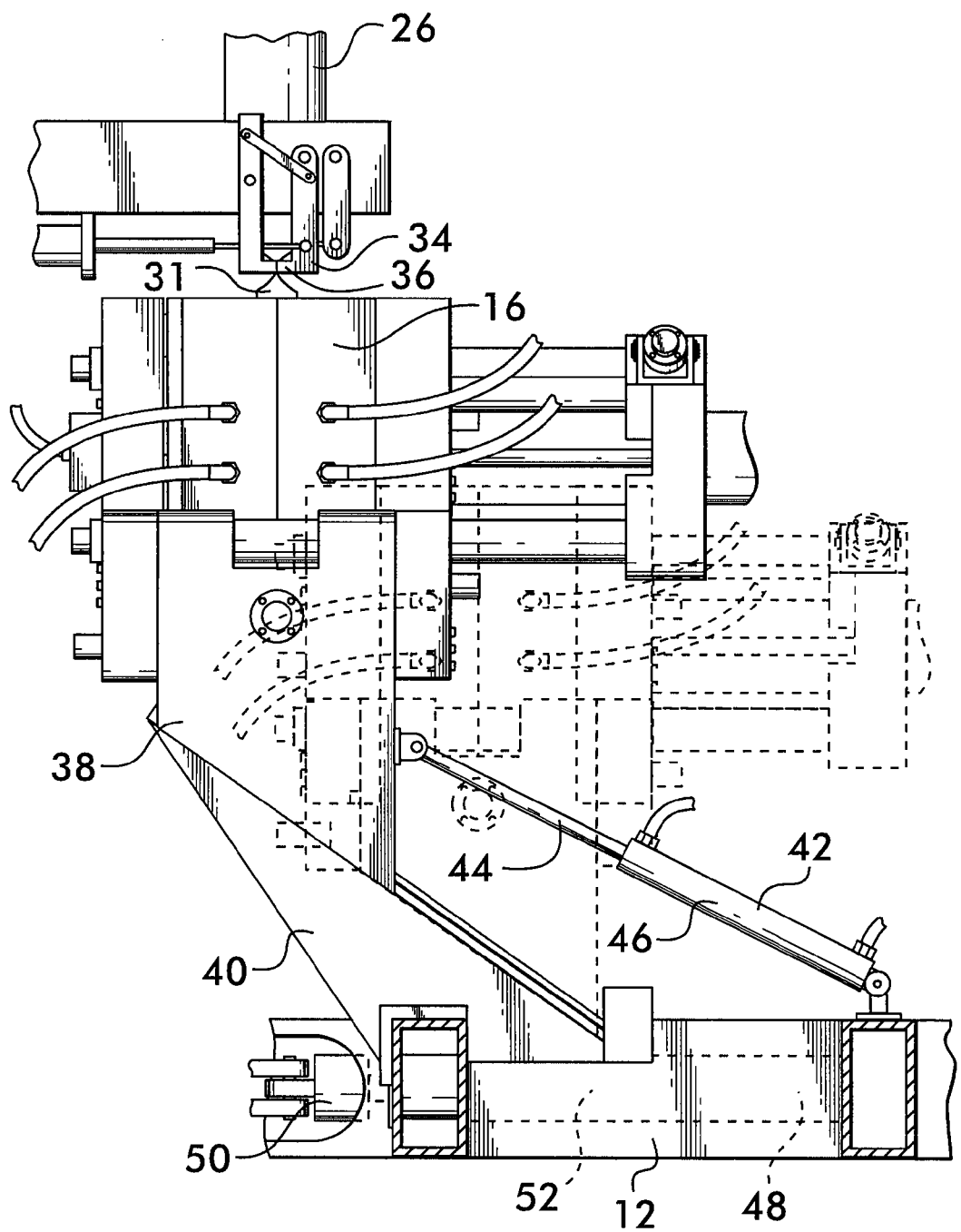
FIG. 3 is a side view illustrating motion of the carriage shown in FIG. 2.

In order to present the molds 16 to the stationary flow head 26, each mold 16 is mounted on a respective carriage 38 which is movably mounted on a respective inclined ramp 40. The ramps 40 are mounted on the turntable 12 as best shown in FIG. 2. As shown in FIG. 3, each carriage 38 is movable between a first, lower position (shown in phantom line) and a second, raised position above the first position to facilitate acquisition of the parison 31 by the mold 16 during operation of the machine 10. The containers 110 are also ejected from the mold 16 when in this second position.

Motion of the carriage 38 along the ramp 40 is preferably effected by a first actuator 42 (which may be a hydraulic actuator) mounted on the turntable 12. The first actuator 42 is preferably a piston 44 movable within a cylinder 46. The first actuator 42 is connected (preferably hydraulically) to a second actuator 48 (which also may be a hydraulic actuator) mounted on the turntable 12. The second actuator 48 also preferably comprises a piston 50 movable within a cylinder 52. Although the first actuator 42 and the second actuator 48 are preferably hydraulic, they could be pneumatic, electromechanical, or another type of device as would be evident to an artisan.

Figure 4:
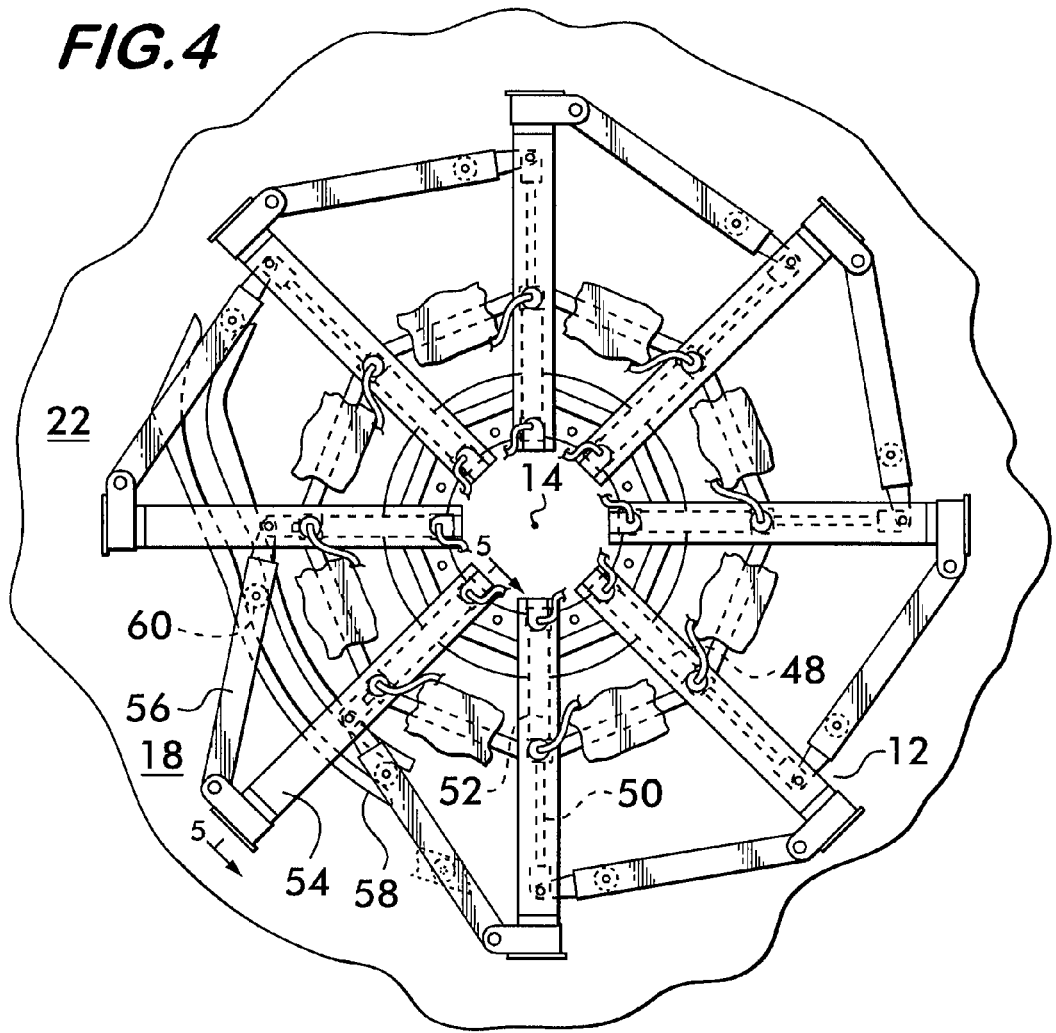
FIG. 4 is a partial plan view of a turntable used on the machine shown in FIG. 1.
Figure 5:
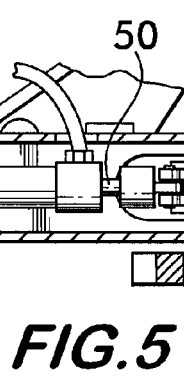
FIG. 5 is a cross-sectional view taken along the line 5-5 of FIG. 4.

The actuators 42 and 48 are hydraulically connected to one another in a closed loop such that actuation of the second actuator 48 causes actuation of the first actuator 42 and vice versa, thereby effecting motion of the carriage 38 up and down the ramp 40. Note that no hydraulic pump or fluid reservoir is required for this system. A specific example of this arrangement is shown schematically in FIGS. 6 and 7, which simultaneously show a plan view of a portion of the turntable 12 and a side view of the carriage 38 and the ramp 40 for clarity of explanation, it being understood that the actual relative orientation of these components is as depicted in FIGS. 3, 4, and 5.

As shown in FIG. 6, a fixed arm 54 is mounted on the turntable 12 and a pivoting arm 56 is pivotably mounted on the end of the fixed arm 54. The piston 50 of the second actuator 48 is pivotably attached to the end of the pivoting arm 56 so that motion of the pivoting arm 56 moves the piston 50 within its respective cylinder 52, thereby actuating the second actuator 48. Motion of the pivoting arm 56 is controlled by a cam track 58 which is positioned adjacent to the first and last stations 18 and 22, respectively.

A cam follower, in this example comprising a pin 60, projects from the pivoting arm 56 and engages the cam track 58 as the turntable 12 rotates the mold 16 through the last and first stations 22 and 18, respectively. As shown in FIG. 7, as the pin 60 traverses the cam track 58, the shape of the cam track 58 forces the pivoting arm 56 inwardly toward the axis of rotation 14 of the turntable 12. This action forces the piston 50 inwardly of its cylinder 52. The cylinder 52 is hydraulically connected to the cylinder 46 by hydraulic lines 61 such that inward motion of the piston 50 forces the piston 44 of the first actuator 42 outwardly from its cylinder 46, thereby moving the carriage 38 up along the inclined plane of the ramp 40 to the raised position depicted in FIG. 7.

The carriage 38 is maintained in this position as long as the pin 60 traverses the cam track 58, and its shape maintains the pivoting arm 56 in its pivoted position, holding the piston 50 stationary relative to its cylinder 52. Further rotation of the turntable 12 moves the mold 16 to the intermediate station 20a (see FIG. 1), and the pin 60 moves free of the cam track 58. The weight of the carriage 38 is all the while exerting a force on the piston 44. The pivoting arm 56 is no longer constrained, however, by interaction between the cam follower (pin 60) and the cam track 58.

The weight of the carriage 38 on the piston 44 forces hydraulic fluid from the cylinder 46 into the cylinder 52. This causes the piston 50, now unconstrained, to move outwardly away from its cylinder 52, thereby allowing the carriage 38 to slide downwardly along the ramp 40 back into the first position. Each carriage 38 in turn is moved from the lowered position to the raised position and back to the lowered position as the turntable 12 rotates and the carriages 38 pass through the last and first stations 22 and 18, respectively.

As each carriage 38 enters the last station 22, the molds 16 mounted on the carriage 38 are opened to release the molded containers 110. Each mold 16 then moves in turn to the first station 18 in the open configuration (see FIG. 2) to receive the next parison portion from parison 31. Opening and closing of the molds 16 is described with reference to FIGS. 8-10.

Figure 8:
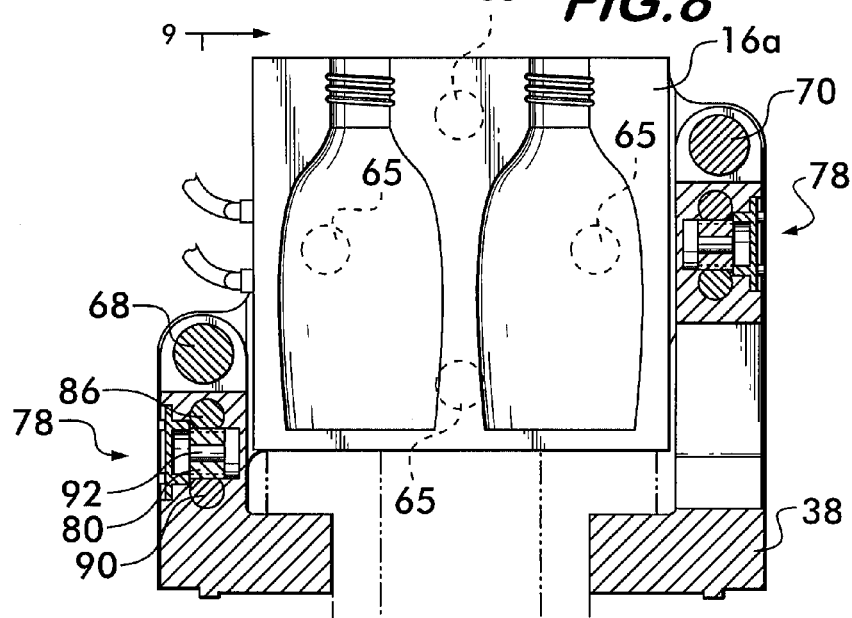
FIG. 8 is a partial sectional view showing the inside of a mold portion used on the machine shown in FIG. 1.
Figure 9:
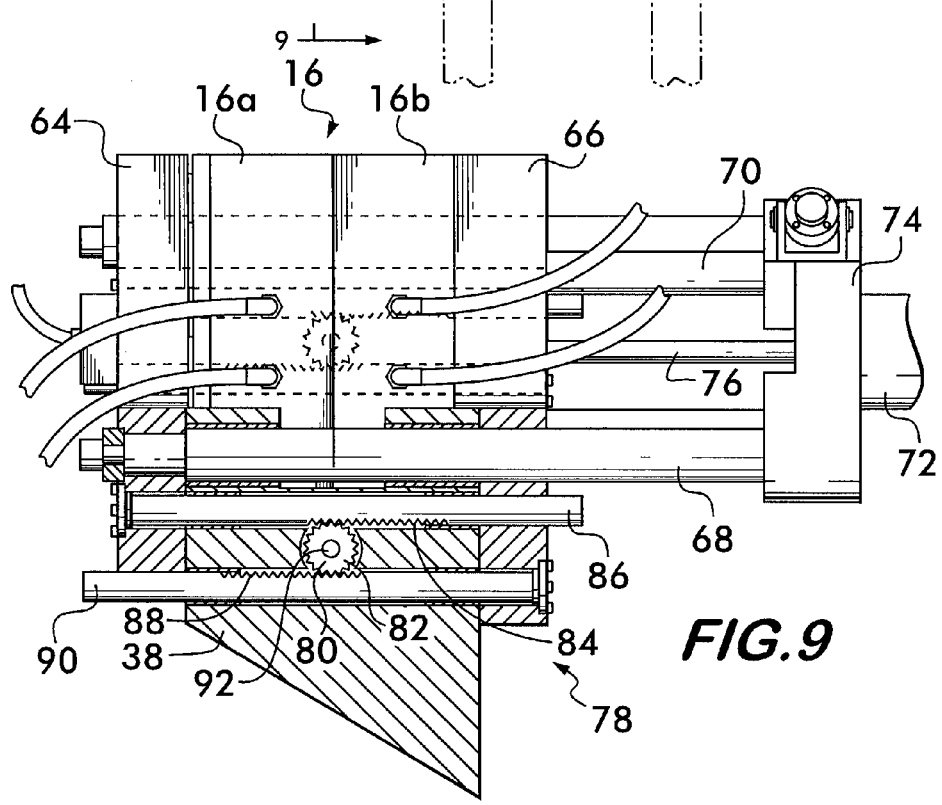
FIGS. 9 and 10 are partial sectional side views, with FIG. 9 taken along the line 9-9 of FIG. 8, illustrating the opening and closing of molds as used on the machine of FIG. 1.

As shown in FIGS. 8 and 9, mold portions 16a and 16b are each mounted on a respective platen 64 and 66. Platens 64 and 66 are mounted on guide rods 68 and 70 arranged in parallel, spaced-apart relation on opposite sides of the carriage 38 as best shown in FIG. 8. The guide rods 68 and 70 are supported on the carriage 38. It is advantageous to position the guide rods 68 and 70 at different heights above the turntable 12, with guide rod 70 positioned above guide rod 68. As the turntable 12 rotates counterclockwise, guide rod 68 leads into the first station 18. As shown in FIG. 2, having the guide rod in a low position allows it to easily clear the parison 31 which dangles from the flow head 26. In addition, the carriages 38 are arranged so that the low guide rod 68 on one carriage 38 is adjacent to a high guide rod 70 on the adjacent carriage 38. This arrangement of the guide rods 68 and 70 prevents interference between the carriages 38 as they move down their respective ramps 40 and permits the carriages 38 to be spaced closer together than if the guide rods 68 and 70 were arranged at the same height. Closer spacing of the carriages 38 allows the turntable 12 to be smaller and to have a smaller mass moment of inertia. This allows smaller motors to be used to turn the turntable 12 and makes the turntable 12 easier to start and stop as it indexes the molds 16 between the various stations 18, 20a-f, and 22.

Figure 10:
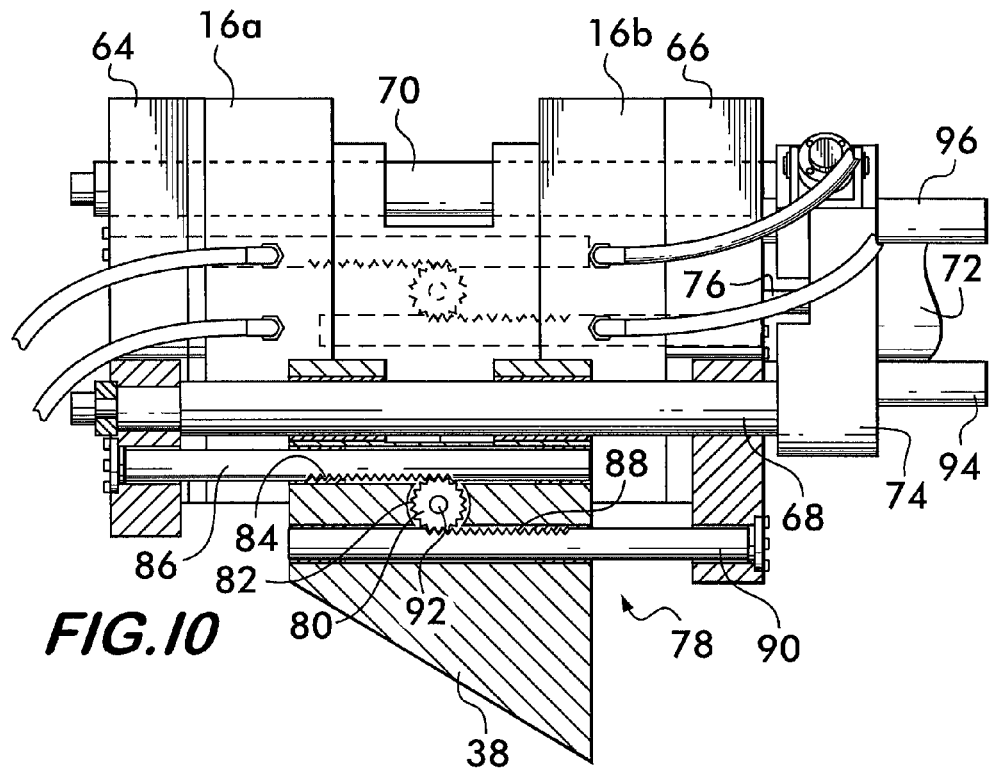

As shown in FIG. 9, the platen 64 is fixedly attached to the guide rods 68 and 70 and the platen 66 is free to slide along the guide rods 68 and 70 between the closed configuration shown in FIG. 9, and the open configuration depicted in FIG. 10. Motion of the platens 64 and 66 and of the molds 16 is effected by an actuator 72 mounted on a crosshead 74 attached to the ends of the guide rods 68 and 70 opposite to the platen 64. The actuator 72 has a movable arm 76 which engages the platen 66, the movable arm 76 moving relative to the actuator 72 and the crosshead 74. The actuator 72 is a long-stroke, low-force actuator designed to quickly move the platens 64 and 66 and their associated molds 16 between the open and closed configurations. The actuator 72 may be hydraulic, pneumatic, electro-mechanical or another type of device.

Additional stability and repeatability of motion of the platens 64 and 66, which ensure that the mold portions 16a and 16b engage each other properly and reliably upon every closing, is afforded by a double rack-and-pinion assembly 78 mounted on each side of the carriage 38. One rack-and-pinion assembly 78 is shown in partial cross section in FIG. 8, in which a pinion 80 is rotatably mounted on the carriage 38. The pinion 80 has a plurality of teeth 82 (see FIG. 9) which engage the teeth 84 on an upper rack 86 and the teeth 88 on a lower rack 90. The upper rack 86 is fixedly attached to the platen 64 and extends into engagement with the platen 66. The platen 66 is slidably movable along the upper rack 86, which also serves to guide motion of the platen 66 similar to the guide rod 68. The lower rack 90 is fixedly attached to the platen 66 and extends into engagement with the platen 64. The platen 64 is slidably movable along the lower rack 90, which also serves to guide motion of the platen 64 similar to the guide rod 68.

The rack-and-pinion assembly 78 causes both platens 64 and 66 to move relative to one another and to the carriage 38 when the actuator 72 operates to open and close the mold portions 16a and 16b. As shown in FIG. 9, the mold 16 is closed with mold portions 16a and 16b in locking engagement. To open the mold 16, as shown in FIG. 10, the movable arm 76 of the actuator 72 is retracted toward the actuator 72, drawing the platen 66 away from the platen 64, and thereby drawing the mold portions 16a and 16b away from one another. Motion of the platen 66 draws the lower rack 90 toward the actuator 72. The teeth 88 on the lower rack 90 mesh with the teeth 82 on the pinion 80. Motion of the lower rack 90 thereby causes the pinion 90 to rotate on its bearing 92 (see FIG. 8) mounted on the carriage 38. The pinion teeth 82 engage the teeth 84 of the upper rack 86, and rotational motion of the pinion 80 thereby operates through the upper rack 86 to move the platen 64 away from the platen 66. The rack-and-pinion assemblies 78 operate in conjunction with the guide rods 68 and 70 to ensure that the mold portions 16a and 16b move precisely and repeatably, along equidistant travel paths, and at the same closure rates on the carriages 38. This mechanism helps maintain the quality of the molded containers 110 throughout a production run by ensuring proper closing of the mold portions 16a and 16b.

Figure 12:
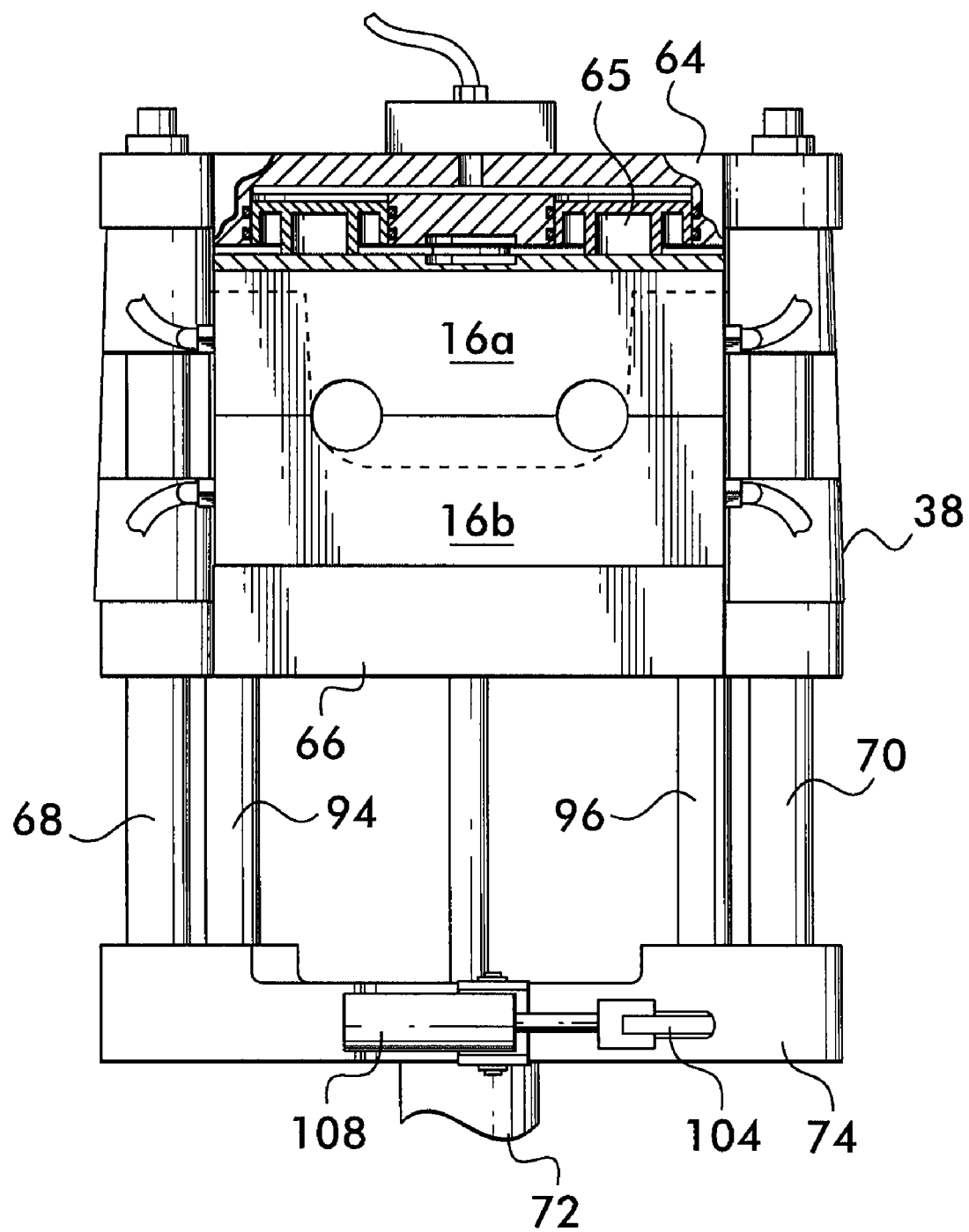
FIG. 12 is a partial sectional top view of a mold and a carriage used on the machine of FIG. 1.

When the mold portions 16a and 16b are in the closed configuration, it is advantageous to apply a clamping force to maintain the mold portions 16a and 16b properly engaged against the internal pressure supplied by the blow pins 30 to force the parison 31 to conform with the shape of the mold cavity. As shown in FIGS. 8 and 12, actuators 65 are positioned between the platen 64 and the mold portion 16a. In this example, four actuators 65 are used to provide as uniform a load as possible on the mold portions 16a and 16b. Other combinations and positioning of the actuators 65 are of course possible. Unlike actuator 72, which initially brings the mold portions 16a and 16b into engagement and is a low-force, long-stroke actuator, the actuators 65 are short-stroke, high-force devices capable of providing a high clamping force. Both the actuator 72 and the actuators 65 are preferably pneumatic for fast response but are supplied by separate respective air sources 67 and 69 depicted schematically in FIG. 1. The air source 67 can be a compressor, for example, and supplies air to the entire machine 10 while the air source 69, which can also be a compressor, is dedicated to supplying air to the actuators 65 only. During machine operation, the clamping force from the actuators 65 may be applied simultaneously with the downward motion of the carriage 38 and the insertion of the blow pins 30 into the molds 16.

Figure 11:
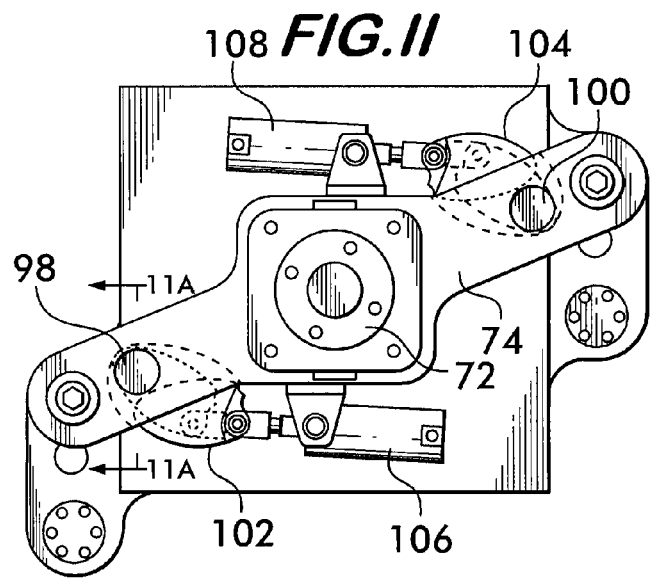
FIG. 11 is an end view of a mold locking device according to the invention.

Positive locking of the mold portions 16*a* and 16*b*, when closed and subjected to the clamping force of the actuators 65, is afforded by one or more locking shafts. In this example, two locking shafts 94 and 96, best shown in FIG. 12, are fixedly mounted on the platen 66 and project from the platen 66 into respective apertures 98, 100 (see FIGS. 11 and 11A) defined in the crosshead 74. Two locking keys 102 and 104 are mounted on the crosshead 74 and may be pivoted into and out of alignment with the respective apertures 98 and 100 by respective actuators 106 and 108 mounted on the crosshead 74.

Figure 11A:
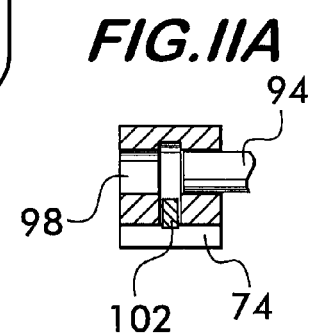
FIG. 11A is a cross-sectional view taken along the line 11A-11A of FIG. 11.

When the molds 16 are closed (FIG. 9), the locking shafts 94 and 96 extend only part way into the apertures 98 and 100 as illustrated in FIG. 11A. As shown in in phantom line in FIG. 11, locking is effected as the actuators 106 and 108 pivot the locking keys 102 and 104 into alignment with the apertures 98 and 100. The presence of the locking keys 102 and 104 prevents the locking shafts 94 and 96 from moving through the apertures 98 and 100 and provides contact points for the clamping force imparted by the actuators 65, thereby preventing any significant motion of the mold portions 16*a* and 16*b* relative to one another while the mold 16 is pressurized. To open the mold 16, the actuators 106 and 108 pivot the locking keys 102 and 104 out of alignment with the apertures 98 and 100, allowing free passage of the locking shafts 94 and 96 through the apertures 98 and 100 (see FIG. 10), and thereby permitting motion of the platens 64 and 66, and consequently of the mold portions 16*a* and 16*b*, away from one another. The actuators 106 and 108 may be hydraulic, pneumatic, electromechanical or other types of devices.

The machine 10 further comprises the container transfer device 32 shown in detail in FIGS. 13-18. The transfer device 32 is positioned at the last station 22 (see also FIG. 1) and operates to remove containers 110 from the molds 16 and transport them away for further processing, such as de-flashing. The transfer device 32 is formed from a plurality of rails 112 interconnected and supported on a three-dimensional frame 113 best understood by a comparison of FIGS. 13, 15, and 16. The rails 112 define legs 114 of a path 116 about which an endless conveyor 118 circulates. The conveyor 118 may be formed of a chain or belt, and is suspended on the frame 113 by a plurality of wheels 120, which can be toothed wheels when a chain conveyor is used, or sheaves when a belt conveyor is used. The conveyor 118 is powered by an electric motor 121 mounted on the frame 113 and acting through a series of belt drives 124 that engage one or more rotary joints 122.

Figure 17:
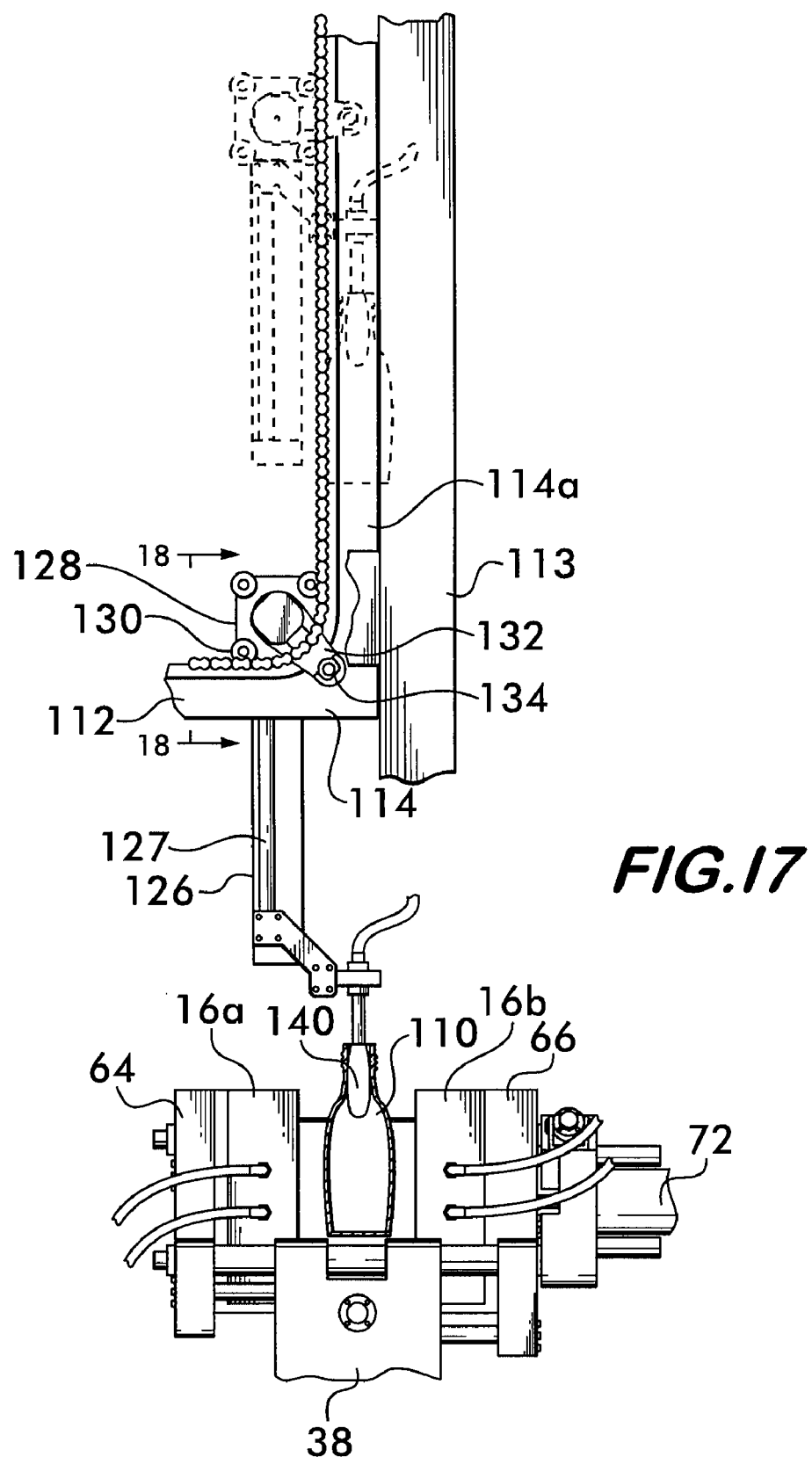
FIG. 17 is a side view, shown on an enlarged scale, of a portion of the container transfer device shown in FIG. 13.
Figure 18:
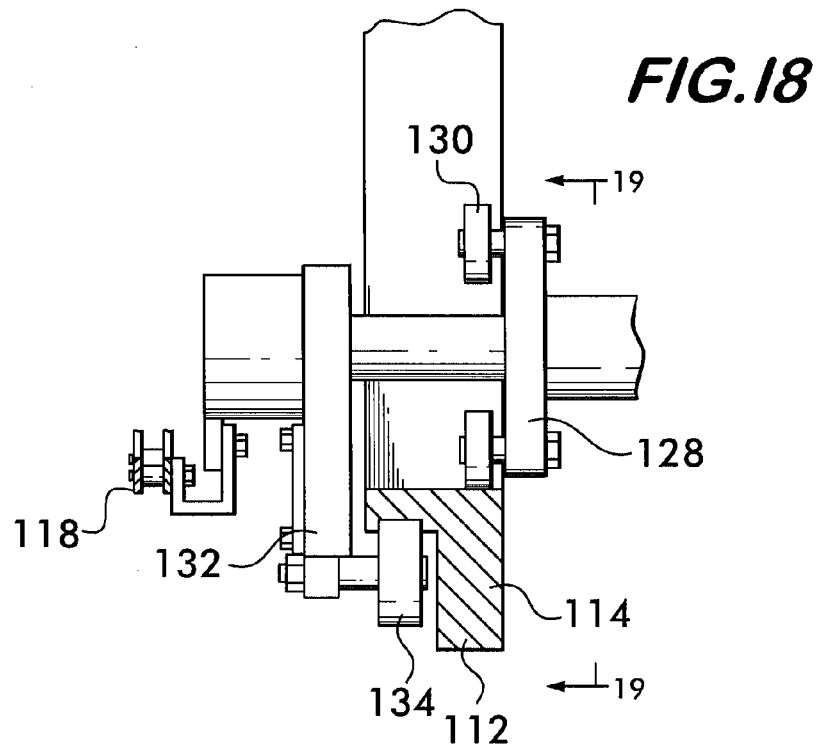
FIG. 18 is a cross-sectional view taken along the line 18-18 of FIG. 17.
Figure 19:
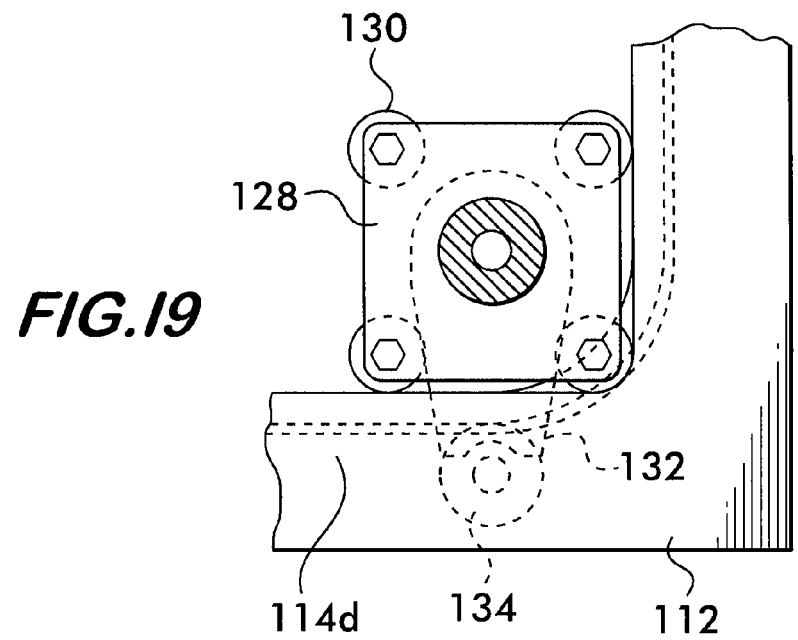
FIG. 19 is a cross-sectional side view of a portion of the container transfer device taken along the line 19-19 of FIG. 18.

In this example, the rails 112 form a rectangular shape when viewed from the side (as in FIG. 13) with vertical leg 114*a* of the path 116 positioned above the last station 22. A plurality of trucks 126 are mounted on the endless conveyor 118. As shown in FIG. 17, each truck 126 comprises a rectangular chassis 128 having four idler wheels 130, one positioned at each corner of the chassis 128. A swing arm 132 is pivotably mounted on the chassis 128 and an opposing wheel 134 is mounted on the swing arm 132. As shown in FIGS. 18 and 19, the idler wheels 130 run on one side of the rails 112 and the opposing wheel 134 runs on the opposite side of the rails 112, the idler and opposing wheels 130 and 134 cooperating to maintain the truck 126 on the rails 112 as it is moved along the path 116 by the endless conveyor 118. When a truck 126 runs along the vertical leg 114*a* as shown in FIG. 14, the vertically arranged idler wheels 130 support the truck 126. When a truck 126 runs along a horizontal leg 114*b* of path 116, the horizontally arranged idler wheels 130 support the truck 126. As shown in FIG. 17, the opposing wheel 134 pivots on the swing arm 132 relative to the truck 126 to always oppose whichever wheel arrangement is supporting the truck 126. This can be seen by a comparison of the truck 126 shown in phantom line with the truck 126 shown in solid line.

Figure 16:
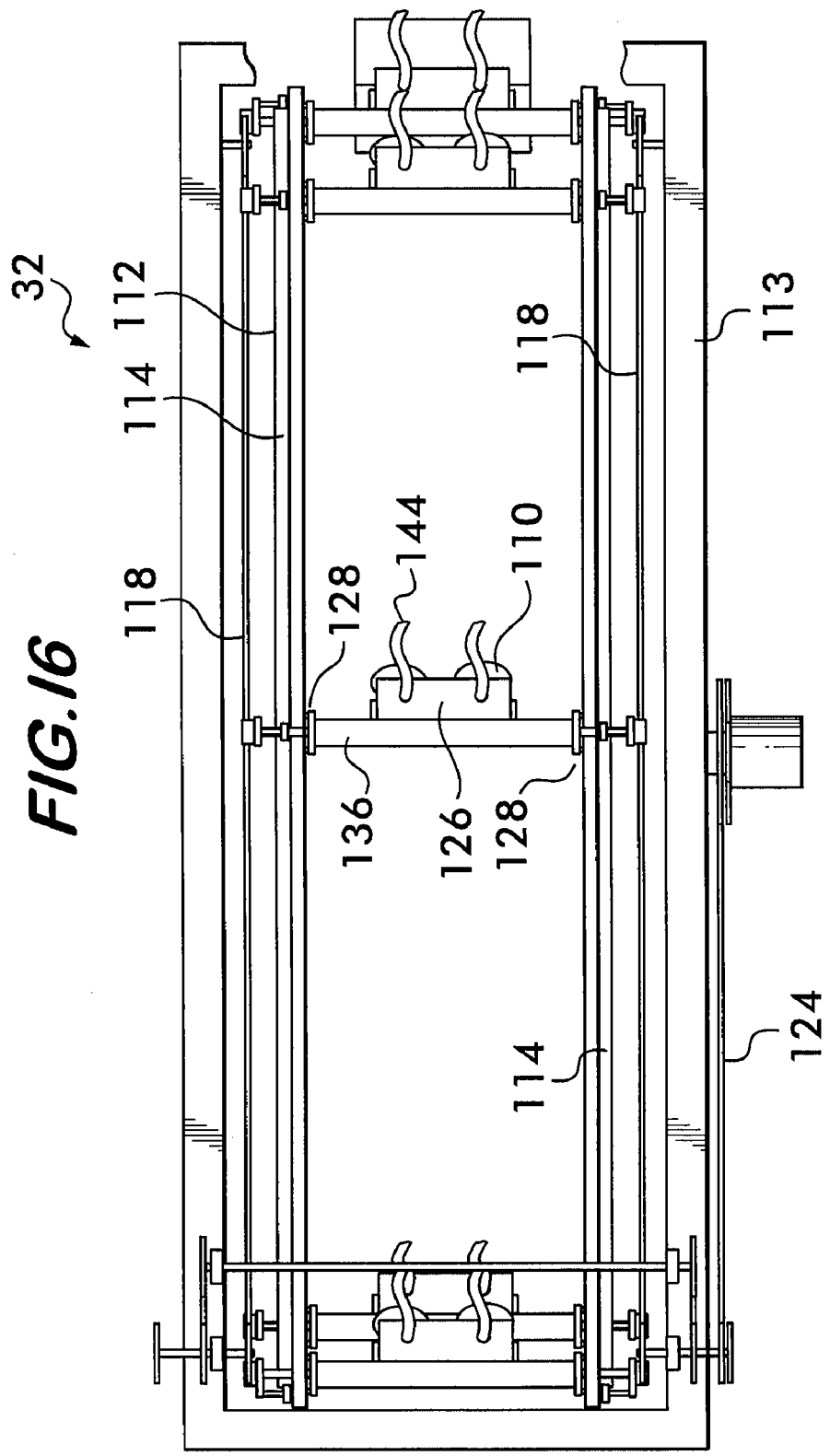
FIG. 16 is a plan view of the container transfer device shown in FIG. 13.

As shown in FIGS. 15 and 16, the trucks 126 are supported by pairs of chassis 128 positioned on opposite sides of the frame 113, the trucks 126 being joined by a shaft 136. As shown in FIG. 17, one or more inflatable bladders 140 are mounted on each truck 126. The bladders 140 are elongated and project downwardly from the truck 126. The bladders 140 are in fluid communication with an inflation mechanism 142 (for example, a compressor) comprising a source of pressurized gas. Hoses 144 connect the bladders 140 to the inflation mechanism 142. The hoses 144 are flexible and have slack so that they can follow the trucks 126 along the path 116. Rotating fluid couplings (not shown) are used to allow the hoses 144 to rotate and prevent twisting as the trucks 126 circulate around their path 116.

The bladders 140 are made of a soft elastomer or other flexible, air-tight, elastic material. As shown in FIG. 13, a truck 126 positions the bladders 140 at the last station 22. When the turntable 12 positions each mold 16 at the last station 22, each mold 16 is in turn raised upwardly into its second position. An actuator 127 on each truck 126 moves the bladders 140 downwardly relative to the truck 126. The downwardly projecting bladders 140, in an un-inflated state, are received within the newly molded containers 110 as the molds 16 are raised and the bladders 140 are lowered.

Once positioned within the containers 110 as shown in FIG. 17, the bladders 140 are inflated so that they engage the inside surfaces of the containers 110. Upon opening of the mold 16, the conveyor 118 moves the truck 126 upwardly along the vertical leg 114*a* of the path 116 (shown in phantom line in FIG. 17) while the actuator 127 moves the container 110 relative to the truck 126. Under the combined upward motion of the truck 126 relative to the mold 16 and the actuator 127 relative to the truck 126, the containers 110, held by the inflated bladders 140, move rapidly clear of the mold 16, which is then moved to the first station 18 by rotation of the turntable 12.

As shown in FIG. 13, the truck 126 is moved by the endless conveyor 118 along the horizontal leg 114*b* and then downwardly along the vertical leg 114*c* of the path 116, at which point the containers 110 may be released by deflating the bladders 140. The containers 110 may be transferred to another transport device and moved for further processing. As the container-laden truck 126 is moving away from the last station 22, another truck 126 is moving into position along the horizontal path leg 114*d* to position another set of bladders 140 to receive containers 110 from the next mold 16.

Operation of the various elements of the machine 10 such as rotating the turntable 12, initiating the actuators 106 and 108 for the locking keys 102 and 104, opening and closing the molds 16, raising and lowering the carriage 38, inflating and deflating the bladders 140, and moving the transfer device 32 are controlled and coordinated by a control system 148 shown in FIG. 1. The control system 148 is preferably a microprocessor-based device such as a personal computer or a programmable logic controller which executes resident software controlling the functional operation of the machine 10. Communication between the various machine elements and the control system 148 may be by wire, by wireless, or by a combination of both wire and wireless communications. Wireless communications are especially advantageous for controlling components on rotating machinery, such as the turntable 12, because these communications avoid the need for complex rotary contacts to transmit electrical signals across rotary interfaces where components are moving relative to one another. Feedback to the control system is provided by various sensors such as micro switches and optical sensors deployed and positioned as required to provide positional information and other status-related information.

The operating system may be used to index the motion of the turntable 12 so that, for example, every mold 16 on the turntable 12 receives a parison 31, or every other mold 16 receives a parison 31, or every third mold 16, or any such combination. This configuration allows different molds 16 to be positioned on the turntable 12 so that production of one type of container 110 (using a first mold 16) may be switched to another type of container 110 (using a second mold 16) without shutting down the machine 10 and changing the molds 16. This avoids costly downtime.

For example, as shown in FIG. 1, two different mold types may be mounted on the turntable 12 with the first type, mold 16c, mounted in an alternating sequence with molds 16d of the second type. Production may begin using molds 16c and then, when this production run is complete, the control system 148 switches the indexing of the turntable 12 so that molds 16d are used (to the exclusion of molds 16c) to produce a different type of container 110. Thus, the machine 10 may be set up once to produce two (or more) different types of containers 110 while reducing the required downtime otherwise required to effect conversion of the molds 16.

Operation of the machine 10 is described from the perspective of a container 110 and with reference to the various figures. The extruders 24 provide molten polymer resin to the flow head 26 which produces the continuous parison 31. One of the carriages 38 is rotated on turntable 12 to the first station 18 with the mold 16 in the open configuration and the carriage 38 in the raised position on ramp 40 so that the mold portions 16a and 16b surround the parison 31. The actuator 72 then closes the mold portions 16a and 16b, the rack-and-pinion assembly 78 operating to ensure proper closure of the mold 16. The actuators 65 exert a clamping force on the mold portions 16a and 16b while the actuators 106 and 108 move the locking keys 102 and 104 into alignment with the apertures 98 and 100 to lock the mold 16 in its closed position. The cutter 34 and the pinch clamp 36 operate to sever a parison portion from the parison 31 and seal the parison 31 so that it can be partially inflated to prevent it from collapsing and adhering to itself.

As the clamping forces are being applied, the turntable 12 rotates the carriage 38 to the second station 20a where one or more blow pins 30 are lowered into engagement with the parison 31 to create the calibrated neck and to inject compressed air into the interior of the parison 31 and force it to conform to the shape of the mold 16. While transiting from the first station 18 to the second station 20a, the cam follower pin 60 exits the cam track 58 and the carriage 38 slides down the ramp 40 under its own weight. The application of clamping forces, lowering of the carriage 38, and insertion of the blow pins 30 may occur substantially simultaneously.

The turntable 12 moves the mold 16 in turn to each of the remaining intermediate stations 20b through 20f allowing the container 110 to cool. At the intermediate station 20f, the blow pins 30 disengage from the container 110 and the mold 16 is moved to the last station 22. The cam follower pin 60 engages the cam track 58 and operates the actuators 48 and 42 to raise the carriage 38 upwardly along the ramp 40. The transfer device 32 has positioned a truck 126 at the last station 22 above the turntable 12 where a downwardly projecting bladder 140 is received within the container 110 still in the closed mold 116.

The bladder 140 is inflated, engaging the container 110, and the actuators 106 and 108 pivot their respective locking keys 102 and 104 out of alignment with the apertures 98 and 100. This action permits the locking shafts 94 and 96 to pass through the apertures 98 and 100 when the actuator 72 opens the mold 16 to release the container 110. Upon opening the mold 16, the truck 126 moves upwardly along the vertical leg 114a of the path 116 while the truck actuator 127 moves the container 110 relative to the truck 126. Once the container 110 is clear of the mold 16, the turntable 12 moves the open mold 16 back to the first station 18 to repeat the process. The truck 126 moves along the path 116 to discharge the container 110 at an appropriate location by deflating the bladder 140.

It is understood that the events described above occur in turn for each mold 16 one after another as dictated by the control system 148. It is also noted that it is possible to position a parison 31 in certain molds 16 to the exclusion of other molds 16 to permit different molds 16 to be mounted on the turntable 12. This flexibility avoids costly downtime when switching production from one type of container 110 to another.

Improved blow molding machines 10 according to the invention provide several advantages over conventional devices. The use of a stationary flow head 26 reduces the potential for container defects and irregularities due to pendulum motion of the parison 31 as it is extruded. The rack-and-pinion assembly 78 ensures that the mold portions 16a and 16b move precisely and repeatably, along equidistant travel paths, and at the same closure rates, characteristics which are advantageous for container consistency and quality. The added container cooling time afforded by positioning the first station 18 at an acute angle 28 from the last station 22 ensures that containers 110 are sufficiently cured so that they may be handled without fear of damage upon removal from the mold 16. Furthermore, using soft, inflatable bladders 140 operating on the inside of the containers 110 to physically handle the containers 110 as they are released from the mold 16 helps to avoid damage, especially to the container neck region, which must maintain close tolerances for receiving spouts and sealing covers. In addition, positioning different molds 16 on the carriages 38 in an alternating or other sequence helps reduce machine down time by avoiding costly changeovers swapping molds 16, and thereby increases productivity.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

What is claimed is:

1. A machine for blow molding containers from a tubular parison formed of plastic resin supplied by an extruder, the machine comprising:

a horizontally oriented turntable rotatable about a substantially vertical axis of rotation;

a plurality of inclined ramps mounted on the turntable, the ramps facing radially outwardly from the turntable;

a plurality of carriages, one carriage mounted on each of the ramps and movable along the ramp between a first position and a second position above the first position;

a first actuator mounted on the turntable and comprising a first piston engaged with one of the carriages for moving the carriage along the ramp;

a second actuator comprising a second piston pivotably attached to a pivoting arm that is pivotably attached to a fixed arm mounted on the turntable, such that motion of the pivoting arm moves the second piston and actuates the second actuator;

a cam track positioned adjacent to the turntable;

a cam follower projecting from the pivoting arm for engaging the cam track as the turntable rotates such that upon said engaging, the pivoting arm moves inwardly toward the axis of rotation of the turntable and thereby moves the second piston inwardly;

the first and second actuators being connected in a closed loop such that movement of the second piston inwardly forces the first piston to move outwardly, thereby actuating the first actuator and moving the carriage up the ramp;

a plurality of molds, one mold being mounted on each of the carriages, the molds including mold portions which are movable between an open configuration to receive the parison and a closed configuration to mold the parison;

a flow head receiving the resin and forming the tubular parison, the flow head being fixedly positioned at a first station of the machine above the turntable;

and the turntable being rotatable to position each of the molds beneath the flow head in turn, each of the molds being movable on the carriages upwardly along the ramps toward the flow head to receive the parison.

2. The machine according to claim 1, further comprising a last station, the turntable being rotatable to position each of the molds at the last station in turn, the molds being in the open configuration at the last station for removal of the containers from the molds, the first station being positioned at an acute angle from the last station measured relative to the turntable axis of rotation.

3. The machine according to claim 2, wherein the acute angle is about 45°.

4. The machine according to claim 1, further comprising a plurality of blow pins mounted on the turntable, at least one blow pin being positioned adjacent to each of the molds, the blow pins being engageable with the molds when in the closed configuration for injecting compressed gas into the molds to effect blow molding of the parison.

5. The machine according to claim 1, wherein the first actuator includes a first cylinder mounted on the turntable and the first piston is movable within the first cylinder; and the second actuator includes a second cylinder mounted on the turntable and the second piston is movable within the second cylinder, wherein movement of the second piston inwardly moves the second piston inside of the second cylinder, and movement of the first piston outwardly moves the first piston outside of the first cylinder.

6. The machine according to claim 5, wherein the cam follower comprises:, a pin projecting from the pivoting arm.

7. The machine according to claim 1, further comprising: first and second guide rods mounted on opposite sides of each of the carriages, one of the guide rods being positioned higher above the turntable than the other on each of the carriages; first and second platens mounted on the guide rods on each of the carriages, the platens being movable along the guide rods toward and away from one another, one of the mold portions being mounted on each of the platens, movement of the platens moving the mold portions between the open and closed configurations.

8. The machine according to claim 7, wherein the guide rods are arranged such that each guide rod positioned higher above the turntable on each of the carriages is positioned adjacent to one of the guide rods in a lower position on an adjacent carriage.

9. The machine according to claim 1, further comprising: first and second guide rods mounted on opposite sides of each of the carriages; first and second platens mounted on the guide rods, the platens being movable along the guide rods toward and away from one another, one of the mold portions being mounted on each of the platens, movement of the platens moving the mold portions between the open and closed configurations;

a third actuator mounted on the guide rods and engaging the first platen, the third actuator moving the first platen toward and away from the second platen for opening and closing the mold portions; a fourth actuator mounted on one of the platens between the one platen and the mold portion mounted on the one platen, the fourth actuator applying a force between the one platen and the mold portion mounted on the one platen to hold the mold portions in engagement with one another when in the closed configuration.

10. The machine according to claim 9, wherein the fourth actuator is mounted on the second platen.

11. The machine according to claim 9, further comprising: a crosshead positioned adjacent to the first platen and attached to the guide rods, the crosshead defining an aperture through the crosshead; a locking shaft mounted on the first platen and having an end engaged with the aperture; the third actuator being mounted on the crosshead and moving the first platen relative to the guide rods toward and away from the second platen, the locking shaft passing through the aperture upon movement of the first platen; and a locking key pivotably mounted on the crosshead, the locking key being pivotable between a first position away from the aperture and a second position aligned with the aperture, the locking key being engageable with the end of the locking shaft to prevent motion of the locking shaft through the aperture when the fourth actuator applies the force.

12. The machine according to claim 11, further comprising a lock actuator mounted on the crosshead, the lock actuator engaging the locking key and moving the locking key between the first and second positions.

13. The machine according to claim 1, wherein the plurality of molds include different types of molds for molding different types of containers.

14. The machine according to claim 1, wherein the plurality of molds include a group of first molds for molding a first container and a group of second molds for molding a second container.

15. The machine according to claim 14 wherein each of the first molds is positioned on one of the carriages adjacent to a carriage carrying one of the second molds in an alternating sequence.

16. The machine according to claim 1, further comprising: first and second guide rods mounted on opposite sides of each of the carriages; first and second platens mounted on the guide rods on each of the carriages, the platens being movable along the guide rods toward and away from one another, one of the mold portions being mounted on each of the platens, movement of the platens moving the mold portions between the open and closed configurations; a first rack attached to the first platen and extending toward the second platen, the first rack having a plurality of teeth; a second rack attached to the second platen and extending toward the first platen, the second rack having a plurality of teeth; a pinion rotatably mounted on each of the carriages and positioned between the first and second racks, the pinion having a plurality of teeth in meshing engagement with the teeth on the first and the second racks; a fifth actuator mounted on the guide rods and engaging the first platen, the fifth actuator moving the first platen and thereby the first rack relative to the guide rods toward and away from the second platen, the pinion rotating in response to motion of the first rack and moving the second rack and thereby the second platen toward and away from the first platen to move the mold portions into the closed and open configurations, respectively.

17. The machine according to claim 1, further comprising a container transfer device positioned at a last station of the machine, the turntable being rotatable to position each of the molds at the last station in turn, the transfer device including: an endless conveyor defining a path having a vertical leg positioned above the turntable at the last station; at least one truck mounted on the conveyor and movable along the path, the truck being positionable above the turntable; at least one inflatable bladder mounted on the truck and extending downwardly from the truck; and bladder inflation mechanism operatively associated with the bladder, wherein the bladder is inserted within one of the containers in one of the molds positioned at the last station, inflation of the bladder gripping the container, the one mold being moved into the open configuration at the last station to release the container, motion of the truck along the vertical leg above the turntable removing the container from the one mold.

18. The machine according to claim 17, further comprising a sixth actuator mounted on the truck, the sixth actuator moving the bladder relative to the truck for positioning the bladder within the containers when at the last station and for removing the containers from the molds.

19. The machine according to claim 17, wherein the path has a rectangular form including another vertical leg and first and second horizontal legs, the truck being movable along the first horizontal leg away from the turntable and toward the turntable along the second horizontal leg.

20. The machine according to claim 19, wherein: the path is defined by a pair of horizontal rails joined to a pair of vertical rails end-to-end; and the truck includes a rectangular chassis having four idler wheels, one idler wheel at each corner of the chassis, the idler wheels riding on one side of the rails, the truck further including a swing arm pivotably mounted on the chassis and having an opposing wheel mounted on an end thereof, the opposing wheel running on an opposite side of the rails from the idler wheels to maintain the truck on the rails.

21. The machine according to claim 1, wherein the first actuator is a hydraulic actuator and the second actuator is a hydraulic actuator, and the first and second actuators are hydraulically connected, and wherein the machine does not include a hydraulic pump or hydraulic fluid reservoir.

22. A mechanism for moving a component mounted on a turntable, the mechanism comprising: a first actuator mounted on the turntable and comprising a first piston engaged with the component; a second actuator mounted on the turntable and comprising a second piston pivotably attached to a pivoting arm that is pivotably attached to a fixed arm mounted on the turntable such that motion of the pivoting arm moves the second piston and actuates the second actuator, a cam follower projecting from the pivoting arm for engaging a cam track, the first and second actuators being connected in a closed loop such that movement of the second piston inwardly forces the first piston to move outwardly, thereby actuating the first actuator; and a cam track positioned adjacent to the turntable, the cam follower being engageable with the cam track upon rotation of the turntable to move the second piston and thereby actuate the second actuator such that the actuation of the second actuates the first actuator and moves the component relatively to the turntable.

23. The mechanism according to claim 22, wherein the first actuator includes a first cylinder mounted on the turntable and the first piston is movable within the first cylinder; and the second actuator includes a second cylinder mounted on the turntable and the second piston is movable within the second cylinder, wherein movement of the second piston inwardly moves the second piston inside of the second cylinder, and movement of the first piston outwardly moves the first piston outside of the first cylinder.

24. A mechanism for opening and closing a pair of mold portions, the mechanism comprising: a guide support; first and second platens mounted on the guide support, the platens being movable along the guide support toward and away from one another, one of the mold portions being mounted on each of the platens, movement of the platens moving the mold portions between an open and a closed configuration; a first actuator mounted on the guide support and engaging the first platen, the first actuator moving the first platen toward and away from the second platen for opening and closing the mold portions; a second actuator mounted on one of the platens between the one platen and the mold portion mounted on the one platen, the second actuator applying a force between the one platen and the mold portion mounted on the one platen to hold the mold portions in engagement with one another when in the closed configuration.

25. The mechanism according to claim 24, further comprising: a pair of guide rods forming the guide support; a crosshead positioned adjacent to the first platen and attached to the guide rods, the crosshead defining an aperture through the crosshead; a locking shaft mounted on the first platen and having an end engaged with the aperture; the first actuator being mounted on the crosshead and engaging the first platen, the locking shaft passing through the aperture upon movement of the first platen; and a locking key pivotably mounted on the crosshead, the locking key being pivotable between a first position away from the aperture and a second position aligned with the aperture, the locking key being engageable with the end of the locking shaft to prevent motion of the locking shaft through the aperture when the second actuator applies the force.

26. A transfer mechanism for moving items, the transfer mechanism comprising: an endless conveyor defining a rectangular path formed by a pair of horizontal rails joined to a pair of vertical rails end-to-end; at least one truck mounted on the conveyor, the truck including a rectangular chassis having four idler wheels, one idler wheel at each corner of the chassis, the idler wheels riding on one side of the rails, the truck further including a swing arm pivotably mounted on the chassis and having an opposing wheel mounted on an end thereof, the opposing wheel running on an opposite side of the rails from the idler wheels to maintain the truck on the rails; and a gripping device mounted on the truck for gripping the items, wherein the endless conveyor moves the truck on the rails along the rectangular path for moving the items gripped by the gripping device along the rectangular path.

27. A method for blow molding a container from a tubular parison of molten resin, the method comprising:
   moving a mold beneath a flow head by rotating a horizontally-oriented turntable about a substantially vertical axis of rotation, wherein the turntable comprises a plurality of inclined ramps mounted on the turntable and facing radially outwardly from the turntable;

a plurality of carriages, one carriage mounted on each of the ramps and movable along the ramp between a first position and a second position above the first position;

a first actuator mounted on the turntable and comprising a first piston engaged with one of the carriages for moving the carriage along the ramp;

a second actuator comprising a second piston pivotably attached to a pivoting arm that is pivotably attached to a fixed arm mounted on the turntable; and a plurality of molds, one mold being mounted on each of the carriages, the molds including mold portions which are movable between an open configuration to receive the parison and a closed configuration to mold the parison, wherein the rotating causes a cam follower projecting from the pivoting arm to engage a cam track positioned adjacent to the turntable such that the pivoting arm moves inwardly toward the axis of rotation of the turntable thereby moving the second piston inwardly and causing the first piston to move outwardly, thereby actuating the first actuator and moving the carriage to which the first actuator is engaged up the ramp and to the second position;

delivering a tubular parison of molten resin from the flow head to the mold mounted on carriage at the second position;

blowing compressed air into the mold to expand the parison and form the container; and removing the container from the mold.

* * * * *

UNITED STATES PATENT AND TRADEMARK OFFICE
CERTIFICATE OF CORRECTION

| | |
|---|---|
| PATENT NO. | : 8,075,834 B2 |
| APPLICATION NO. | : 12/682903 |
| DATED | : December 13, 2011 |
| INVENTOR(S) | : Kwasniewski et al. |

It is certified that error appears in the above-identified patent and that said Letters Patent is hereby corrected as shown below:

Column 13,
Line 60, delete the ":" and "," following the words "follower comprises" so that line 60 reads:
"follower comprises a pin projecting from the pivoting arm.".

Column 16,
Line 6, after "second" and before "actuates" insert --actuator--.

Signed and Sealed this
Twenty-eighth Day of February, 2012

David J. Kappos
*Director of the United States Patent and Trademark Office*